US005774058A

United States Patent [19]
Henry et al.

[11] Patent Number: 5,774,058

[45] Date of Patent: Jun. 30, 1998

[54] REMOTE ACCESS SYSTEM FOR A PROGRAMMABLE ELECTRONIC LOCK

[75] Inventors: Trenton B. Henry; B. Howard Dame, both of Austin, Tex.

[73] Assignee: Vindicator Corporation, Austin, Tex.

[21] Appl. No.: 504,717

[22] Filed: Jul. 20, 1995

[51] Int. Cl.[6] ................................ G06K 7/00; F05G 1/00

[52] U.S. Cl. ................................ 340/825.31; 340/825.34; 70/264; 235/382.5; 395/188.01; 395/726; 109/32

[58] Field of Search ......................... 340/825.31, 825.22, 340/825.34; 70/262, 263, 264, 271; 367/197; 364/222.5; 235/382.5, 382; 361/172; 395/188.01, 186, 187.01, 726; 109/32; 49/24; 902/1, 24, 25

[56] References Cited

U.S. PATENT DOCUMENTS

| | | | |
|---|---|---|---|
| 3,842,629 | 10/1974 | Pazer et al. | 340/825.31 X |
| 3,906,447 | 9/1975 | Crafton | 340/825.31 X |
| 4,218,690 | 8/1980 | Ulch et al. | 340/825.31 |
| 4,727,369 | 2/1988 | Rode et al. | 340/825.31 |
| 5,204,663 | 4/1993 | Lee | 340/825.31 X |
| 5,349,345 | 9/1994 | Vanderschel | 340/825.31 |
| 5,397,884 | 3/1995 | Saliga | 340/825.31 X |

FOREIGN PATENT DOCUMENTS

| | | | |
|---|---|---|---|
| 92/07342 | 4/1992 | WIPO | 340/825.31 |

*Primary Examiner*—Michael Horabik
*Assistant Examiner*—William H. Wilson, Jr.
*Attorney, Agent, or Firm*—Kevin L. Daffer; Lawrence J. Merkel; Conley, Rose & Tayon

[57] ABSTRACT

A remote access system remotely accesses one or more electronic locks from a locally placed computer. The computer includes a key receptacle electrically coupled to the computer. The key receptacle allows ingress of a key, whereupon insertion of the key and login permission granted allows access of the computer to an electronic lock via a communication channel. The electronic lock is mechanically, electrically and functionally connected to activate and deactivate a locking mechanism of a lockable device. According to one arrangement, the computer is connected to the electronic lock via the communication channel to allow the user remote login to the electronic lock. The user located remote from the lock may therefore operate the lock from the remote location.

14 Claims, 10 Drawing Sheets

Microfiche Appendix Included
(6 Microfiche, 579 Pages)

FIG.8
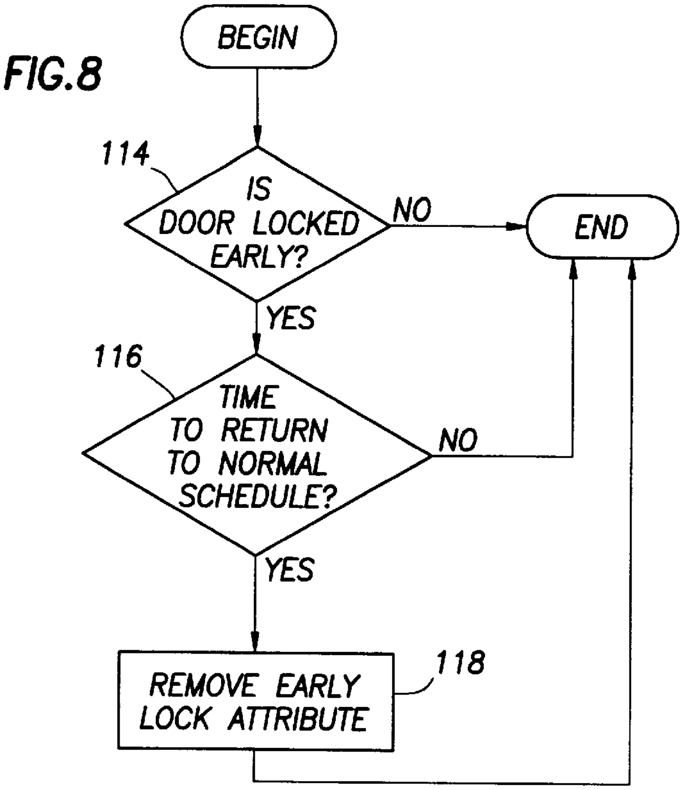
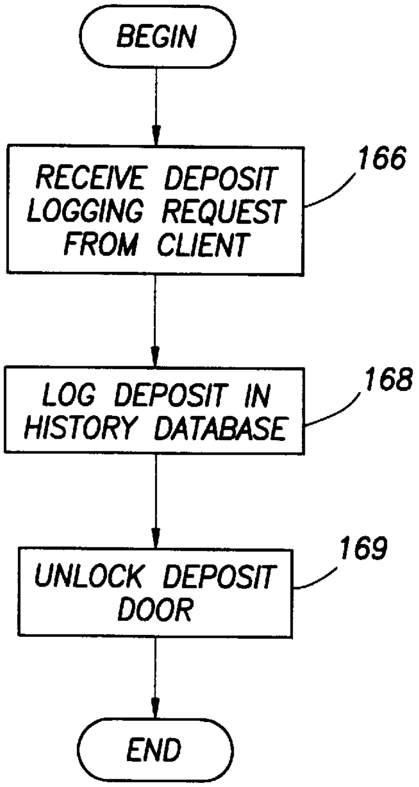
FIG.12

FIG. 13
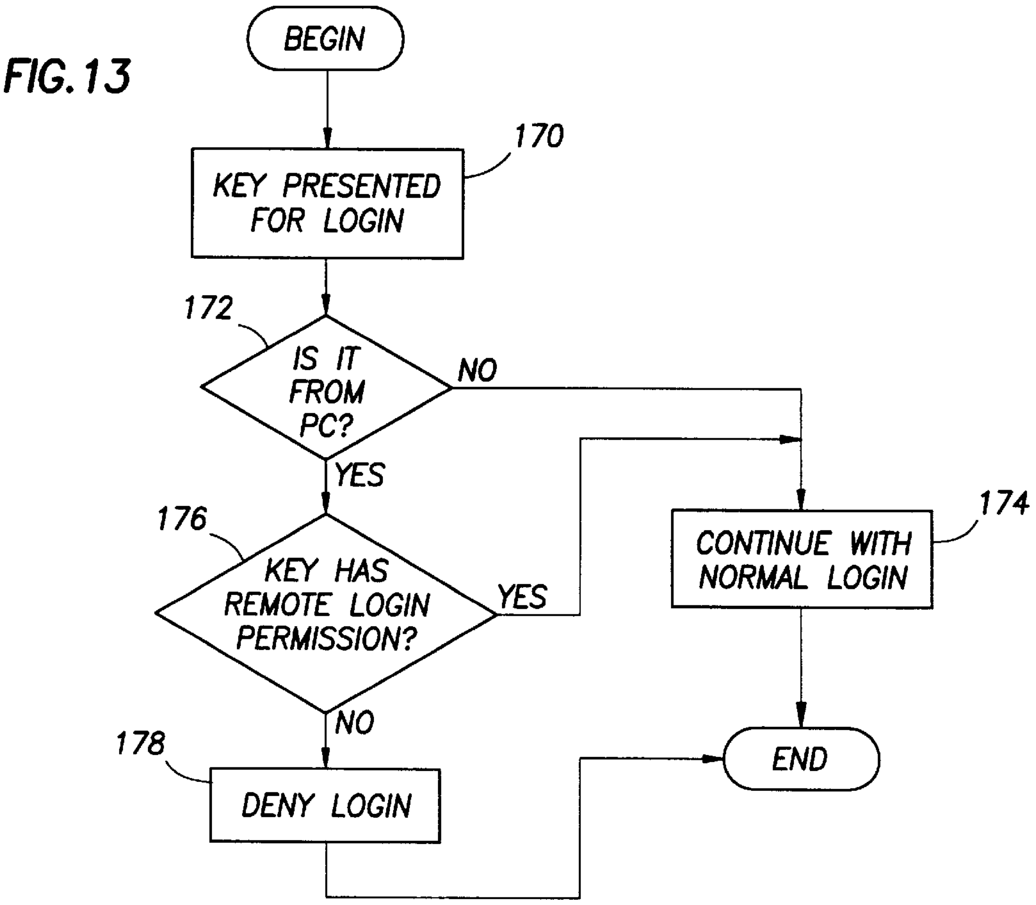
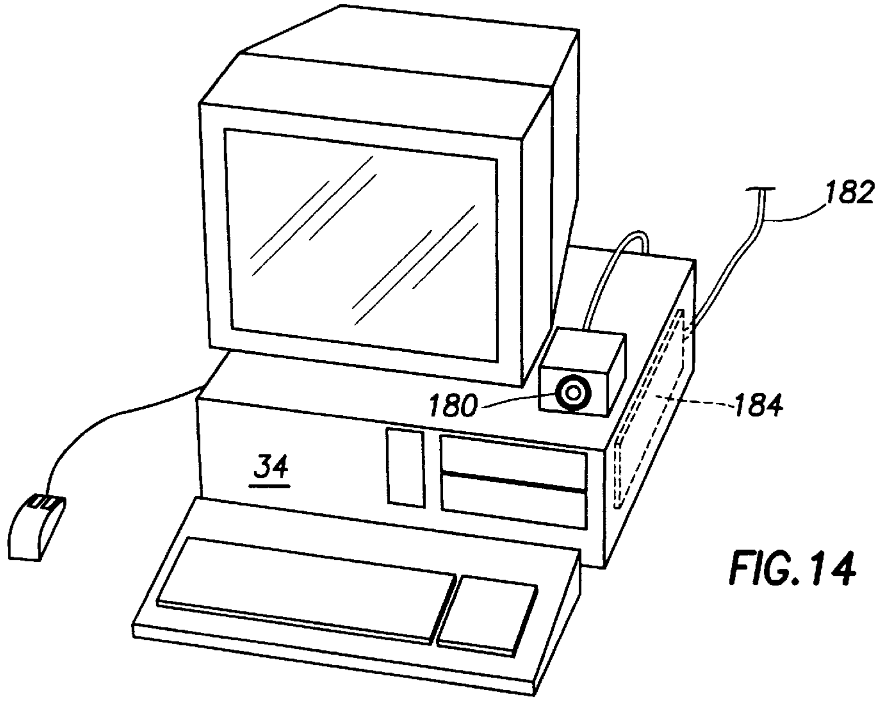
FIG. 14

REMOTE ACCESS SYSTEM FOR A PROGRAMMABLE ELECTRONIC LOCK

BACKGROUND OF THE INVENTION

Incorporated herein is a computer program listing microfiche appendix of source code used to provide the features of the lock described herein and access database source code used in the personal computer described herein for performing remote login. Copyright, 1995, Vindicator Corporation. A portion of the disclosure to this patent document contains material which is subject to copyright protection. The copyright owner expressly reserves all copyright rights whatsoever to materials contained in this disclosure, including materials within the "microfiche appendix" comprising 6 microfiche consisting of 579 pages which are incorporated herein by reference.

1. Field of the Invention

This invention is related to the field of electronic locks and, more particularly, to electronic locks having programmable functionality.

2. Description of the Relevant Art

For many years, mechanical locks were used to provide secure closure of storage housings such as safes. Such mechanical locks are typically opened via a key or a combination entry. Unfortunately, mechanical locks have several limitations. For example, mechanical locks may often be opened using locksmith tools. Additionally, mechanical locks are relatively unsophisticated in their activation or deactivation of a locking mechanism. An exemplary locking mechanism comprises a reciprocating bolt. When activated, the bolt protrudes from the door of the safe into the housing such that the door cannot be opened. When deactivated, the bolt retracts from the housing into the door such that the door may be opened. Alternatively, the bolt may be attached to the housing and protrude into the door and retract from the door upon activation and deactivation, respectively.

More recently, electronic locks have become available. An electronic lock may perform processing upon user input before causing a locking mechanism to activate or deactivate. Such processing allows more sophisticated functionality than the aforementioned mechanical locks. A higher level of security may be maintained than was previously achievable using mechanical locks. As used herein, the term "user" refers to any person who is enabled to operate the lock at least for purposes of activating or deactivating the locking mechanism. Some users may be enabled to perform other functions with respect to the lock, such as producing reports of user accesses to the lock.

Electronic locks are often configured to perform a particular type of processing for a given functionality. The flexibility of such a lock is therefore limited. A purchaser of such a lock may not be able to adapt the processing of the lock to suit the purchasers needs. For example, electronic locks may be configured to unlock at a first specified time and to lock at a second specified time each day. However, a situation may arise in which the user needs to lock the safe at a time prior to the second specified time on a particular day. It is inconvenient for the user to modify the predetermined locking time in order to lock the safe early for one day. Additionally, allowing a user the capability to change the locking schedule contributes to a lack of security when the user is not the owner of the locked contents. Such a user might modify the locking schedule in order to remove, without the owner's permission, the items secured by the lock. A more flexible locking schedule is desired without sacrificing security.

Some electronic locks are configured to accept an electronic key from each user before allowing access to the safe. Each user is accorded a separate key which identifies that user. A particular key can be removed, or deactivated, from a list of authorized keys maintained by the electronic lock such that the electronic lock will not deactivate the locking mechanism in response to the deactivated key. This method of securing access to the safe requires a significant administrative burden upon an administrator of the lock. An "administrator" is a person empowered to change various security and flexibility features of the lock. An automated method for controlling access to the lock is desired.

Additionally, many electronic locks are configured to collect access data such as which users have accessed the lock and what actions they performed. Such access data can often be printed by connecting a printer to the electronic lock. However, for users who purchase multiple locks and place them in locations which are distant from each other, collecting reports of access data from all the locks is a time consuming and expensive process. Reports must be printed from each lock and collected in a central location. If the reports are to be compared to one another using a computer, or if they are to be stored on the computer, then they must be manually entered into the computer. Additionally, if a single administrator is assigned to administer all of the electronic locks, that administrator may have to travel to the location of each lock in order to perform administrative duties (such as activating or deactivating keys). A less costly and less time consuming method for administering and collecting data at areas remote from the electronic lock is desired.

SUMMARY OF THE INVENTION

The problems outlined above are in large part solved by a remote access system according to the present invention. The present remote access system includes a computer, a key receptacle electrically coupled to the computer, and an electronic lock configured to activate and deactivate a locking mechanism of a lockable device. The computer may be connected to the electronic lock via a communication channel such that a user remote from the location of the lock may login, similar to a user who locally inserts a key into the electronic lock. Instead of local access to the lock, however, a remote user can fully operate the lock, e.g., administer and collect data regarding the amount and times during which any user has gained access to the lock. Accordingly, reports of lock accesses may be gathered and lock databases may be administered from the remote location without requiring the remote user to waste time travelling to the location of the lock.

The remote access system disclosed herein enables a single administrator to operate, administer and/or collect data regarding multiple, remotely situated locks. The locks may be located large distances from each other and from the administrator. Security is typically enhanced with respect to previous lock solutions by remotely disabling administrative control from users other than the important personnel. A remotely located lock administrator can therefore dictate who can access the lock, and when the lock can be accessed. The administrator can configure the operating parameters of the system to prevent unauthorized personnel from reconfiguring the lock. If lock security is compromised via reconfiguration of its operating parameters, the administrator may then be identified as the culprit.

Additionally, cost savings may be realized using the present remote access system. For example, travel costs associated with transporting the remote user to each lock site are eliminated. Additionally, data transferred from the remote lock is advantageously stored within the local computer. Local accumulation of data associated with multiple locks is more readily accessed, maintained and manipulated than from numerous remote sites.

Broadly speaking, the present invention contemplates a remote access system comprising a computer, a key receptacle, an electronic lock, and a communication channel. The key receptacle is electrically coupled to the computer, and is adapted to receive a key. The key is configured to present information indicative of a user, and the key receptacle is configured to convey that information to the computer. Functionally connected to a locking mechanism, the electronic lock includes a programmable unit for activating and deactivating the locking mechanism and for reconfiguring the programmable unit according to a set of operating parameters stored within the programmable unit. Coupled between the computer and the electronic lock is the communication channel. The computer provides, through distal access, information to the electronic lock via the communication channel.

The present invention further contemplates an electronic lock. The electronic lock includes an input device, a remote communication port, and a programmable unit. The input device includes buttons located proximate to (or local to) the programmable unit. The communication port is also located proximate to the programmable unit, and allows communication from a remotely situated computer to the programmable unit via the port. Electrically coupled to both the input device and the communication device, the programmable unit allows login of a user via the input device, as well as allowing login of a remote user over the communication port.

BRIEF DESCRIPTION OF THE DRAWINGS

Other objects and advantages of the invention will become apparent upon reading the following detailed description and upon reference to the accompanying drawings in which:

FIG. 8 is a flowchart of a second server portion of the programmable timelock early function according to the present invention;

FIG. 12 is a flowchart of the server portion of a programmable deposit logging function according to the present invention;

FIG. 13 is a flowchart of a remote login function according to the present invention; and FIG. 14 is a front perspective view of a personal computer with an electronic key reader attached to the computer for allowing remote communication to the electronic lock via the personal computer keyboard.

Figure 1:
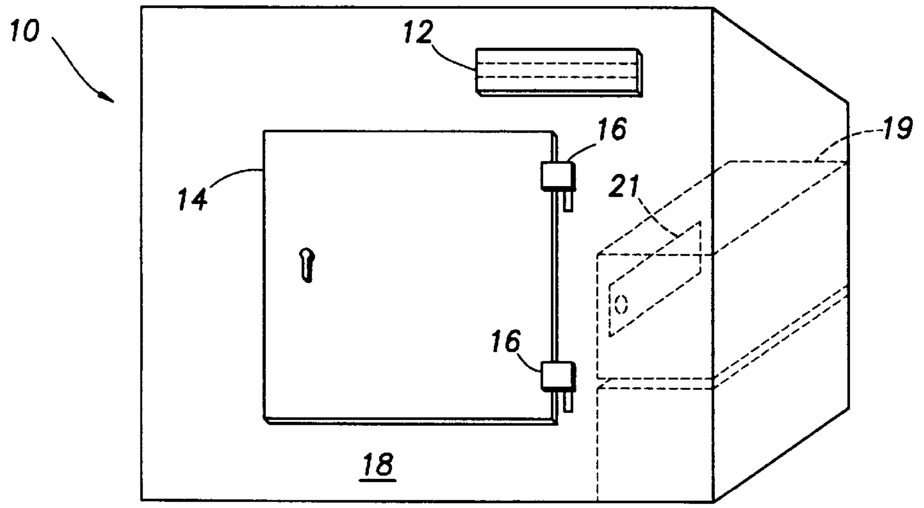
FIG. 1 is a front perspective view of a safe having an electronic lock according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a front perspective view of an exemplary safe 10 employing an electronic lock 12 according to the present invention is shown. Safe 10 includes an outer door 14 coupled to a housing 18 via a pair of hinges 16. In order to access items stored within safe 10, outer door 14 must be unlocked and opened. Electronic lock 12 is configured to activate and deactivate the locking mechanism which lockably secures outer door 14. Within housing 18 are multiple inner chambers 19, shown in phantom. Each inner chamber 19 is configured with an inner door 21 which has an associated locking mechanism similar to outer door 14. Electronic lock 12 is configured to activate and deactivate the internal locking mechanisms as well as the external ones. In one embodiment, electronic lock 12 is configured to control the locking mechanisms of up to five doors. The five doors controlled may be any combination of outer doors and inner doors. Other embodiments may be configured to control different numbers of doors.

Certain doors of safe 10 may be configured as deposit doors. Deposit doors are arranged to open such that items (such as parcels containing money) may be placed into the associated inner chamber but items may not be removed from the inner chamber through the deposit door. Electronic lock 12 is additionally configured to monitor sensor inputs which identify which inner and outer doors of safe 10 are open and which inner and outer doors are closed.

Figure 2:
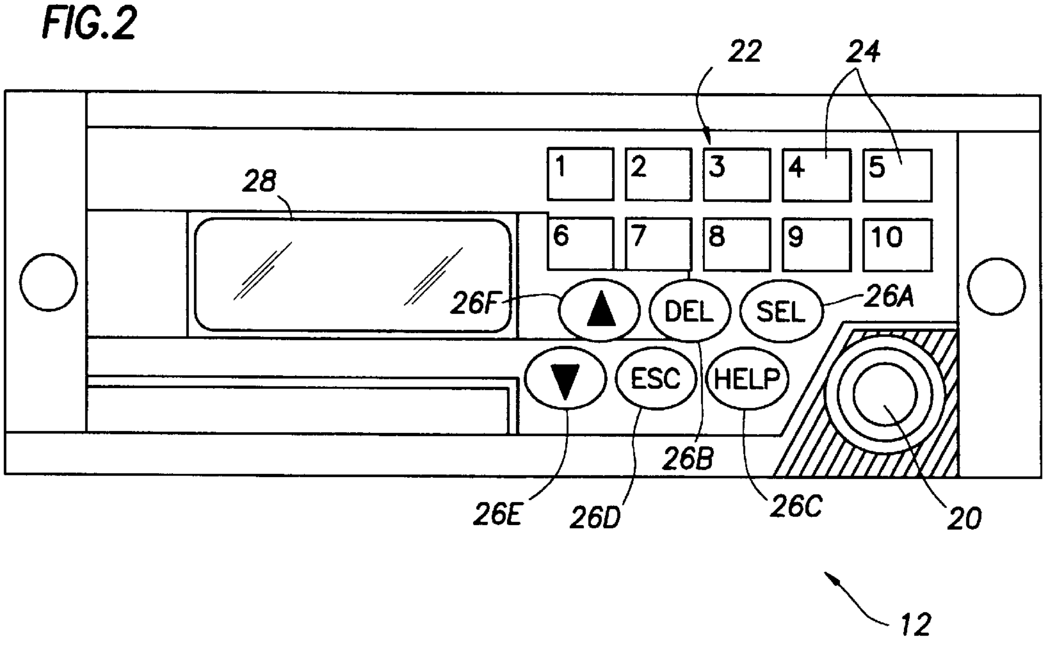
FIG. 2 is a front view of an operating panel for the electronic lock according to the present invention.

Turning next to FIG. 2, a frontal view of one embodiment of electronic lock 12 is shown. Electronic lock 12 is configured with a key receptacle 20 for receiving user-assigned electronic keys insertable therein. In one embodiment, key receptacle 20 is adapted to receive a DS1992 touch memory (or equivalent) housed as a key and available from Dallas Semiconductor, Inc., of Dallas, Tex. Such a key is capable of storing 1024 bits of information. The information stored in the key according to one embodiment of the present invention is described in more detail below.

Electronic lock 12 is configured with a keypad 22 which allows a user to input data into lock 12. In one embodiment, keypad 22 includes buttons 24 for inputing numerical values to lock 12. Keypad 22 additionally includes buttons 26 which are useful for selecting options displayed on a display screen 28 (button 26A), for requesting additional information from the electronic lock in cases when the user is confused by information presented on display screen 28 (button 26C), and for manipulating the information displayed on display screen 28 (buttons 26B, 26D, 26E, and 26F). Exemplary manipulations include scrolling the information up and down if all the information may not be displayed on display screen 28 simultaneously.

In one embodiment, display screen 28 is a liquid crystal display (LCD) capable of displaying up to four lines of characters. Each line is capable of displaying up to 16 characters. Display screen 28 is used by electronic lock 12 to communicate with a user.

Figure 3:
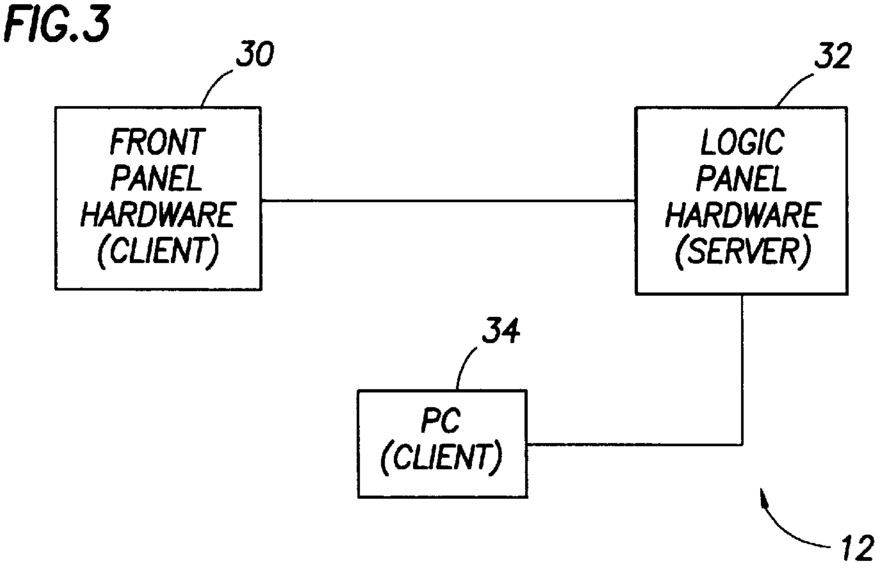
FIG. 3 is a block diagram of the internal hardware of the electronic lock including a front panel and a logic board with a personal computer attached thereto.

Turning now to FIG. 3, a block diagram of one embodiment of electronic lock 12 is shown. Hardware implementing electronic lock 12 is configured into a client/server configuration. The difference between a client and a server may be understood with respect to the actions that may be performed upon a database maintained by lock 12. As used herein, the term "database" refers to a collection of related data items. For example, a database of keys and data associated with each key is maintained. Additionally, a database of accesses to electronic lock 12 is maintained including information about the user performing the access and the access performed. Data items stored in these databases will be described in more detail below. A "client" is a device which may request information from the database and which may request that information be added to the database. A client may not actually modify the database. Conversely, a "server" may make modifications to the database (either of its own accord or at the request of a client).

Front panel hardware 30 is included in electronic lock 12. Front panel hardware 30 is a client as described above, and is configured to provide user interface functionality such as displaying messages on display screen 28 (shown in FIG. 2) and accepting input from keypad 22 and key receptacle 20. Front panel hardware 30 communicates with the server within electronic lock 12 in order to convey information to and from the various databases at the request of the user. Additionally, front panel hardware 30 communicates with the server to convey user action requests. Exemplary action requests are for the activation or deactivation of the locking mechanism associated with a particular door.

Logic panel hardware 32 is further included in electronic lock 12. Logic panel hardware 32 is a server according to the above definition, and hardware 32 provides information to clients and maintains the various databases within lock 12. Logic panel hardware 32 also controls the locking mechanisms associated with safe doors and maintains current time and date information. Logic panel hardware may connect to front panel hardware 30, and additionally may connect to other clients such as a printer (not shown) for printing reports. Another possible client is a personal computer (PC), shown as block 34 in FIG. 3. In one embodiment, PC 34 is an IBM compatible personal computer running the Windows© operating system from Microsoft Corp of Redmond, Wash. PC 34 may be connected to logic panel hardware 32 via a pair of modems or via an RS-232 cable. When the pair of modems is used, one modem is attached to PC 34 and a second modem is attached to logic panel hardware 32. The modems may be connected to one another using a typical telephone line. In one embodiment, logic panel hardware 32 supports modems with data transfer speeds of 1200, 2400, and 9600 baud.

Front panel hardware 30 and logic panel hardware 32 are "programmable units". Each is equipped with a processor for executing programs installed within the units. Based on values stored in the databases maintained by logic panel hardware 32, the programs will execute differently, advantageously enabling flexibility with respect to security features and other functionality provided by front panel hardware 30 and logic panel hardware 32. Additionally, the combination of front panel hardware 30 and logic panel hardware 32 forms a programmable unit having two processors.

Figure 4:
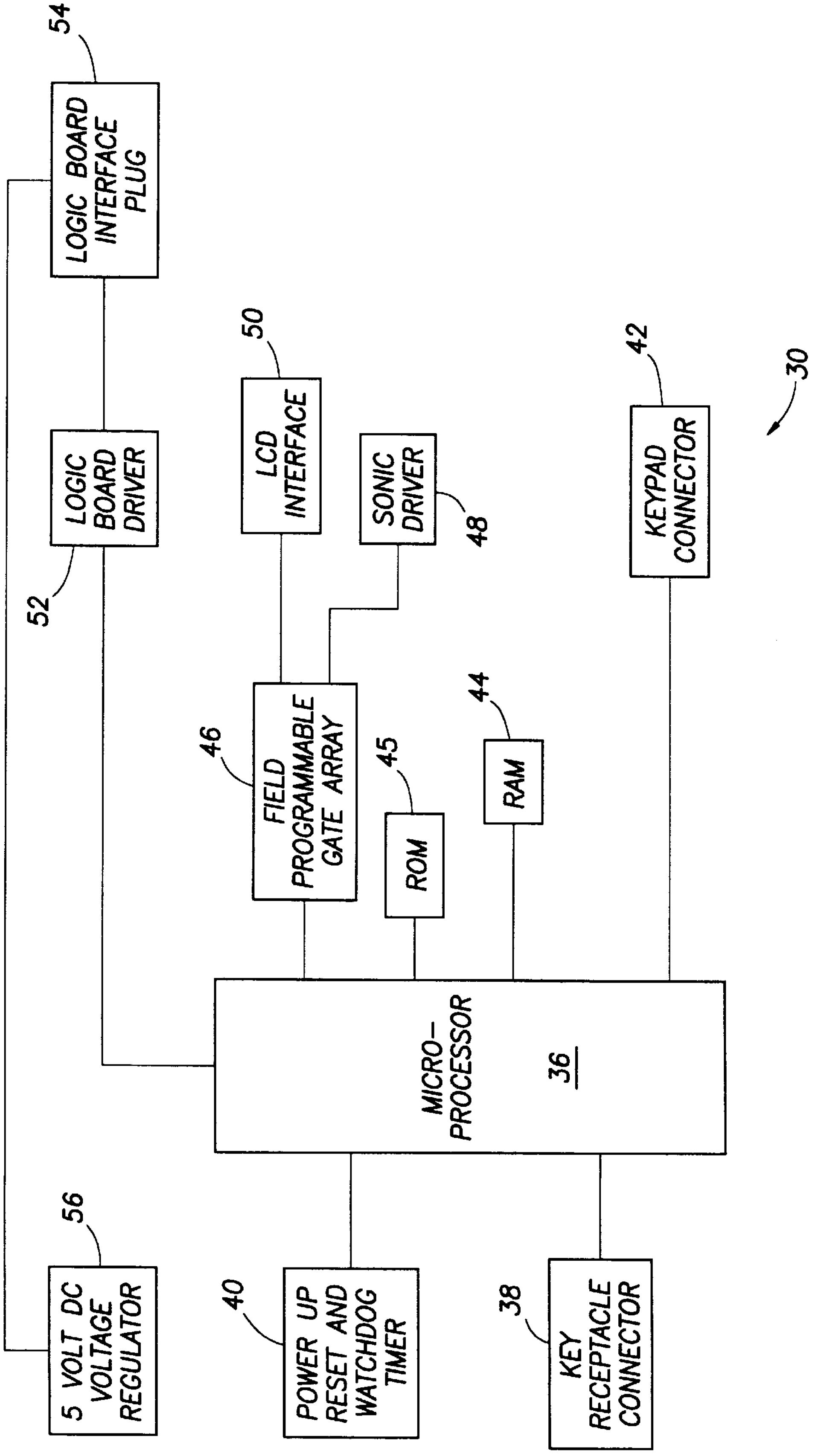
FIG. 4 is a block diagram of exemplary hardware forming the front panel portion of the electronic lock shown in FIG. 3.

Turning next to FIG. 4, a block diagram of exemplary hardware forming front panel hardware 30 (shown in FIG. 3) is shown. Front panel hardware 30 includes a microprocessor 36, a key receptacle connector 38, a power up reset and watchdog timer 40, a keypad connector 42, a random access memory (RAM) 44, a read-only memory (ROM) 45, a field programmable gate array 46, a sonic driver 48, an LCD interface 50, a logic board driver 52, a logic board interface plug 54, and a five volt DC voltage regulator 56.

Microprocessor 36 is configured to execute a program stored within ROM 45. According to the program, microprocessor 36 (i) controls LCD interface 50 for display of messages on display screen 28 (shown in FIG. 2), (ii) controls sonic driver 48 for producing audible sounds from a sonic speaker (not shown), and (iii) controls logic board driver 52 for communicating with logic board hardware 32 (shown in FIG. 3). Gate array 46 is provided for facilitating control of LCD interface 50 and sonic driver 48 by microprocessor 36. In one embodiment, microprocessor 36 is an 80C51 microprocessor which may be obtained from Intel Corp, Sunnyvale, Calif.

Microprocessor 36 is additionally coupled to a key receptacle connector 38 which is connected to key receptacle 20 (shown in FIG. 2). Receptacle connector 38 provides electrical connection between key receptacle 20 and microprocessor 36 such that microprocessor 36 may communicate with a key inserted into key receptacle 20. In one embodiment, key receptacle 20 includes a ground conductor and a data conductor. The ground conductor is coupled to a ground voltage, and the data conductor (radially spaced from the ground conductor) conveys data between a key and front panel hardware 30.

Timer 40 is configured to reset microprocessor 36 to a known initial state from which the program stored within ROM 45 may be executed. Such a reset is performed when front panel hardware 30 is initially powered on, for example. Additionally, timer 40 is configured to reset processor 36 after a counter internal to timer 40 records the passage of a defined interval of time. The program stored within ROM 45 is configured to access timer 40 periodically such that the counter is reset prior to the passage of the defined interval of time. As long as the program is executing properly, microprocessor 36 is not reset. However, if the program enters a portion of program code that should, but does not, complete within the defined interval of time, then microprocessor 36 is reset. The portion of program code may not complete due to the failure of one of the devices shown in FIG. 4, due to an error in the program, or due to a user data entry error, for example. Resetting microprocessor 36 causes front panel hardware 30 to return to an operable state. An exemplary timer 40 is manufactured by Maxim Technologies of Sunnyvale, Calif., part no. 705.

RAM 44 is used to store data currently being manipulated by microprocessor 36. For example, user input parameters may be stored in RAM 44 prior to communicating them to logic board hardware 32. Keypad connector 42 electrically connects microprocessor 36 to keypad 22 (shown in FIG. 2)

such that microprocessor 36 may detect when a key within keypad 22 is pressed by a user. In one embodiment, keypad connector 42 is an eight pin parallel connector.

Logic board interface plug 54 is adapted to receive a cable connecting logic board hardware 32 to front panel hardware 30 for communication between the two. In one embodiment, logic board interface plug 54 is an 8 wire modular connector compatible with RS-485 specifications. Logic board driver 52 is configured to amplify signals provided by microprocessor 36 for transport through logic board interface plug 54 and across a wire to logic board hardware 32. Five volt DC regulator 56 is configured to receive power from logic board hardware 32 through logic board interface plug 54 and to maintain a voltage level substantially near five volts with respect to ground. This voltage level powers microprocessor 36 as well as other portions of front panel hardware 30.

Figure 5:
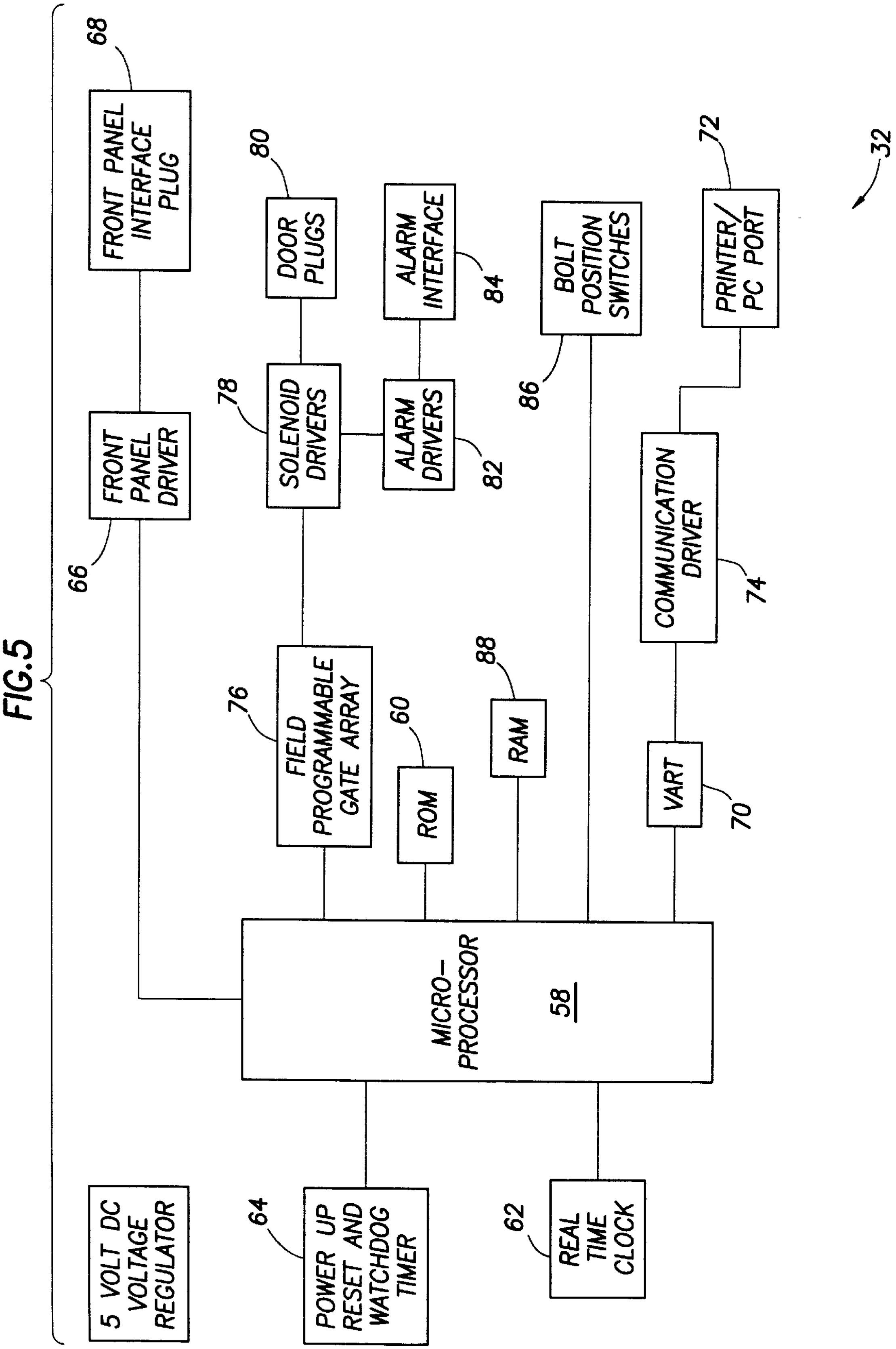
FIG. 5 is a block diagram of exemplary hardware forming the logic board portion of the electronic lock shown in FIG. 3.

Turning now to FIG. 5, exemplary hardware forming logic board hardware 32 is shown. Logic board hardware 32 includes a microprocessor 58 configured to execute a program stored within ROM 60. In accordance with the program, microprocessor 58 communicates with a real time clock control unit 62 which maintains time and date information. An exemplary real time clock control unit may be obtained from Benchmarq Corp. of Carrollton, Tex., model no. BQ4287MT. Additionally, microprocessor 58 communicates with a power up reset and watchdog timer 64 similar to timer 40 shown in FIG. 4. A front panel driver circuit 66 is used to amplify communicative signals from microprocessor 58 for transfer to front panel hardware 30 through front panel interface plug 68. Front panel driver circuit 66 is similar to logic board driver 52, and front panel interface plug 68 is similar to logic board interface plug 54.

A universal asynchronous receiver transceiver (UART) 70 is also coupled to microprocessor 58 for providing communication to an RS-232 serial port 72. Communication driver circuit 74 is coupled between port 72 and UART 70 for amplifying communicative signals between port 72 and UART 70.

Field programmable gate array 76 facilitates microprocessor 58 communication with solenoid drivers 78. Solenoid drivers 78 are configured to amplify signals from gate array 76 such that they are suitable for interface to a locking mechanism on a safe door. The amplified signals are conveyed to a set of door plugs 80. Door plugs 80 are suitable for receiving a four wire modular plug. Solenoid drivers 78 additionally drive signals to an alarm driver circuit 82. Alarm driver circuit 82 is configured to convey signals suitable for connection to an external alarm system. Exemplary alarm systems include model DS7090 and DS7100 manufactured by Detection Systems, Inc. of Fairport, N.Y. An additional exemplary alarm system is the Z1100 system produced by Aritech-Moose of Hickory, N.C. Signals from alarm driver circuit 82 are conveyed to an alarm interface 84 which provides optical connection points to the external alarm system.

A set of bolt position switches (shown as reference number 86) communicate the open or closed status of each door to microprocessor 58. The open or closed status of each door is signaled by a door sensor attached to each door. Electronic lock 12 is configured to broadcast an audible alarm if a door is left open longer than a particular time interval, or if the door is opened without using a proper key.

Microprocessor 58 is coupled to a RAM 88 which stores database values and user input parameters, as will be described below in detail. The database structure maintained by electronic lock 12 may be referred to as a "distributed multidatabase". The distributed multidatabase is a global organization of data which is stored in multiple local databases. Each local database maintains control over the data it stores. The global organization allows for an integrated presentation to the user (i.e. the data is not divided into multiple sections dependent on the database from which the data is derived). Due to the global organization, a user may manipulate data without knowledge of the database into which the data will be stored.

In the case of lock 12, the databases are stored in RAM 88 and within each electronic key that is associated with lock 12. Data is either stored within each individual key (if the data is key specific), or within the database maintained by logic board hardware 32 within RAM 88. In one embodiment, key specific data is also stored within the database of logic board hardware 32. However, when a specific key is logged into lock 12, the data is read from the key and the data within the database of logic board hardware 32 is updated. Therefore, the data stored on the key is considered to be the most recent data associated with that key. With respect to key specific data, the keys are servers as defined above.

Before discussing a specific embodiment of the databases associated with lock 12, an overview of lock 12 structure will be presented. Logic board hardware 32 (referred to below as the server) performs numerous functions. These functions include: maintenance of the key database, the operating parameters database, and the history database; generation of database reports and history reports; validation of requests from clients; monitoring door open/close states; interfacing with an external alarm system; encryption and decryption of key data; decryption of personal identification numbers (PINs) entered on the keypad of lock 12 by a user; enrollment of a starter key (defined below); and communication with clients.

Front panel hardware 30 (referred to below as a client) also performs numerous functions, including: managing the user interface; operating the key receptacle, keypad, sonic speaker, and display screen; and communicating with the server. A second client is PC 34, with similar functionality to front panel hardware 30.

For a user to access electronic lock 12, the user must present a valid key to the lock. The key is inserted into key receptacle 20 (shown in FIG. 2), and the user may optionally be requested to enter a PIN. The use of PINs will be described in more detail below. When a key and, optionally, a PIN are entered into lock 12, then the user is said to be "logged in" to lock 12. When a user has logged in, the user may perform actions with respect to lock 12 subject to a set of permissions associated with that user. One embodiment of the permissions will be described in more detail below.

One embodiment of the database stored within each key is given as Table 1 below:

TABLE 1

| Key Database Parameters |
|---|
| Key-Level |
| Enrollment-Level |
| Key-Permission-Control |
| Maximum-Key-Administration-Authority |
| Location-Code |
| Location-Restriction |
| Manufacturer-Usage-Code |
| OEM-Usage-Code |
| Encryption-Type |

TABLE 1-continued

| Key Database Parameters |
| --- |
| Customer-Company-Code |
| Key-Series |
| Key-Type |
| Key-Number |
| Key-Serial-Number |
| Employee-Unique-Identifier |
| User-Name |
| PIN |
| PIN-Date |

A Key-Level is stored for each key. In one embodiment, the Key-Level may be a number between 0 and 100. The meaning of the Key-Level parameter is defined by the purchaser of lock 12, who also specifies the Key-Level parameter for each key. Key-Level may not be modified by the server.

The Enrollment-Level parameter is typically set to the same value as the Key-Level. The Enrollment-Level is a level used by the server to determine whether or not a key which is currently logged in may enroll a second key in the server's database. The process of enrolling the second key is the process which validates (or activates) the second key so that a user may login to lock 12 using the second key. While typical keys have an Enrollment-Level which is the same as the key's Key-Level, certain keys may be encoded with an Enrollment-Level which is less than the Key-Level. A key's Enrollment-Level determines the Key-Level required to enroll the key. A key having an Enrollment-Level lower than its Key-Level may be enrolled by a second key having a Key-Level between the key's Key-Level and Enrollment-Level. Enrollment-Level may not be changed by the server.

The Key-Permission-Control parameter is used as part of the permissions structure of lock 12. Each key is enabled or disabled to perform functions of lock 12, according to the purchaser's desires. One embodiment of the permissions is described below. The Key-Permission-Control parameter includes two values. One value is the permission defaults which specify whether or not the key is enabled to perform each individually enableable function of lock 12. In one embodiment, a bit is used for each function wherein a binary one stored in that bit indicates enablement and a zero indicates disablement of that function for that key. The second value is the permission modifiability which indicates, for each enableable function, whether or not the key's permission for that function may be changed by the server. When a server changes a permission for a key, the change is stored in the server's database but not on the key. Therefore, the key's permissions will be the same if the key is used to login to another lock similar to lock 12.

Maximum-Key-Administration-Authority is a parameter used to limit the Key-Levels that a particular key is allowed to administer. Administration may involve enrolling the key as well as deactivating the key such that the key may not be used to log into lock 12. The Maximum-Key-Administration-Authority parameter, in conjunction with the Key-Level parameter, is used to determine the Key-Levels of keys which may be administered by the key. For enrollment purposes, a key may administer another key having an Enrollment-Level less than or equal to the lesser of the Maximum-Key-Administration-Authority and the Key-Level minus one. In one embodiment, Maximum-Key-Administration-Authority is a number between 0 and 100. Maximum-Key-Administration-Authority may not be changed by the server.

Another key parameter is the Location-Code. The Location-Code is a value indicative of a particular lock 12, and is stored within that lock. When a key is first enrolled the Location-Code of the enrolling lock is stored on the key in the Location-Code parameter. The Location-Code is used along with the Location-Restriction parameter to determine whether or not a key may be enrolled into another lock. When a key (which has been previously enrolled into another lock) is presented to a lock for enrollment, the Location-Code of the lock must match the Location-Code stored in the key in a number of most significant digits defined by the Location-Restriction parameter. In one embodiment, the Location-Code is ten digits. Therefore, if a Location-Restriction of a particular key is set to ten, then the key may not be enrolled into any other locks than the lock in which it was originally enrolled. However, if the Location-Restriction is set to 7, then the key may be enrolled into a lock whose Location-Code matches the Location-Code stored on the key in the most significant 7 digits. Therefore, the key may be enrolled into multiple locks. The Location-Restriction parameter may not be modified by the server.

The Manufacturer-Usage-Code is encoded information for use by the manufacturer of lock 12. This parameter is reserved so that the same key technology may be used by the manufacturer for products other than lock 12. The Manufacturer-Usage-Code would then identify a key for use with a particular product. Similarly, the OEM-Usage-Code is reserved for manufacturers of devices which incorporate lock 12. The manufacturer of devices which incorporate lock 12 is referred to as an original equipment manufacturer (OEM). The Manufacturer-Usage-Code and OEM-Usage-Code may not be modified by a server.

Data within the key except for Manufacturer-Usage-Code, OEM-Usage-Code, and Encryption-Type is encrypted. The Encryption-Type parameter indicates how the data is encrypted. Additionally, seeds associated with the encryption are stored within the key. It is noted that any encryption/decryption method may be employed by lock 12.

The Customer-Company-Code identifies a key as belonging to a particular company. Since Customer-Company-Codes are different for each customer (or purchaser, as referred to above), keys belonging to one customer may not be enrolled in locks belonging to another customer. In one embodiment, the Customer-Company-Code is four digits. The Customer-Company-Code may not be changed by a server.

Customers may define different Key-Series so that entire sets of keys may be disallowed from using lock 12 without specifically deactivating the set of keys. Lock 12 is configured with a similar parameter which defines the Key-Series that will be allowed access to the lock. The Key-Series parameter of a particular key must match the Key-Series parameter of lock 12 for the key to login to that lock. In one embodiment, the Key-Series parameter is three digits.

A Key-Type parameter is stored within each key identifying the set of Key-Permission-Controls and other controls recorded into the key. The Key-Type parameter allows for operations based on a particular Key-Type. Otherwise, Key-Types would be synthesized by the server upon each access by comparing the information specified by the Key-Type to information indicative of a Key-Type, requiring more instruction code in the server. In one embodiment, Key-Type is a two digit number.

Each key may be identified for tracking of individual keys by its Key-Number. In one embodiment, the Key-Number is six digits. The Key-Number may also be printed on the exterior face of the key. Additionally, the Key-Type may be printed on the exterior face of the key. The Key-Serial-Number parameter is a forty-eight bit code imprinted into the key by manufacturer of the key. There is a one-to-one correspondence between Key-Numbers and Key-Serial-Numbers.

The Employee-Unique-Identifier is a number which uniquely identifies a user who is assigned the key. In one embodiment, the Employee-Unique-Identifier is ten digits. Additionally, a User-Name parameter (of up to ten characters in one embodiment) is used to identify the user who is assigned the key. The User-Name parameter may be printed in reports to make the reports more human-readable. Both the Employee-Unique-Identifier and the User-Name parameters may be modified by the server.

The PIN parameter stores the PIN number currently in use by the key. The PIN-Date parameter stores the date on which the PIN parameter was last changed. Both the PIN and the PIN-Date parameters may be updated by the server.

Turning now to the database of keys stored on the server, Table 2 lists the parameters stored in the database of keys for one embodiment of the server. In addition to the parameters listed in Table 2, the parameters listed in Table 1 are stored in the database of keys for each key enrolled in lock 12.

TABLE 2

| Database of Keys Parameters |
| --- |
| Key-Administration-Authority |
| Successive-Bad-PIN-Count |
| Auto-Deactivation-Date |
| Last-Login-Date |
| Login-Delay-Start-Time |
| Login-Delay-Start-Date |
| Usage-Limit |
| Usage-Count |
| Status |
| Active-Permissions |

The Key-Administration-Authority parameter identifies the highest Key-Level upon which the key may perform administration functions. The Key-Administration-Authority is the lesser of the key's Key-Level minus one and its Maximum-Key-Administration-Authority parameter.

The Successive-Bad-PIN-Count Parameter records the number of attempts to login with the key in which a "bad" (or incorrect) PIN number was entered. The parameter is cleared when a correct login occurs. When the Successive-Bad-PIN-Count reaches a Pin-Reject-Limit Parameter (explained below), then the key is either deactivated or a Login-Delay (explained below) occurs.

A key may be deactivated automatically by setting the Auto-Deactivation-Date parameter to a specified date. If the Auto-Deactivation-Date parameter is zero then the Auto-Deactivation-Date parameter is not in use for the key. It is noted that a value of zero for the Auto-Deactivation-Date parameter (and other parameters which store dates) is indicative of Jan. 1, 1992. Other values of dates are stored as integers. The integer is the difference in the number of days between Jan. 1, 1992 and the recorded date.

The Last-Login-Date parameter stores the date on which the last successful login of the associated key occurred. Additionally associated with logins are the Login-Delay-Start-Time and Login-Delay-Start-Date parameters. The Login-Delay-Start-Time and Login-Delay-Start-Date parameters record the time and date at which the Successive- Bad-PIN-Count parameter reached the PIN-Reject-Limit. These values are checked against the current time and date, respectively, if a login delay has been initiated for this key. If the specified login delay interval is longer then the difference between the current time and date and these parameters, then the login is rejected by lock 12.

A number of logins that a key is permitted to perform may be limited by the Usage-Limit parameter. In one embodiment, the Usage-Limit parameter is a number between 0 and 255. A value of zero indicates that the key is enabled for unlimited logins. The Usage-Count parameter is incremented for each successful login. If Usage-Count becomes equal to Usage-Limit, then subsequent logins of the associated key are rejected by lock 12.

The status parameter is included for storing a key's status. In one embodiment, a key's status includes the states of enrolled, inactive, uninitialized, and unknown. An uninitialized key is a key for which a lock has no information. An inactive key is a key that has been deactivated. A key may be deactivated in numerous ways as described herein. An enrolled key is a key which has been enrolled via the above mentioned enrollment procedure. An unknown key is a key that has attempted to login to lock 12 but is not enrolled within lock 12. The key database of the unknown key is copied into the database of keys within lock 12 so that a record of the attempted login is available.

The Active-Permissions parameter stores the set of permissions associated with a particular key. The active permissions are copied from the permissions defaults stored within the key. Modifiable permissions may then be changed within the active permissions of the key. Permissions not identified as modifiable may not be changed within the active permissions.

If a key within the database of keys is deactivated and then later reactivated, an automatic permissions revocation process occurs. According to this process, when the deactivated key is reactivated, the modifiable permissions which are not permissions in the key performing the reactivation will be revoked on the reactivated key (i.e. the permissions will be disabled).

A second server database is the operating parameters database. This database stores parameters affecting the operation of lock 12 for all users, as opposed to key specific operation which is specified in the database of keys. Table 3 lists the operating parameters stored in one embodiment of the operating parameters database. It is noted that the operating parameters (as well as key database and database of keys parameters) may be manipulated via user input to front logic hardware 30 or via user input to PC 34.

TABLE 3

| Operating Parameters |
| --- |
| Require-PIN-Entry |
| Pin-Life |
| Idle-Key-Life |
| PIN-Reject-Limit |
| PIN-Reject-Mode |
| Login-Delay-Duration |
| PIN-Entry-Timeout |
| User-Input-Timeout |
| Duress-Pin-Mode |
| Location-Code |
| Min-Max-Key-Level |
| Lost-Key-Override-Enable |
| Daylight-Savings-Schedule |
| Door-Configuration |

TABLE 3-continued

| Operating Parameters |
| --- |
| Openable-Intervals |
| Timelock-Early |
| Timelock-Override |
| Delay-Interval |
| Access-Interval |
| Open-Warning-Interval |
| Log-Deposits |

Each operating parameter is described in more detail below.

The Require-PIN-Entry operating parameter enables and disables the requirement that a PIN be entered for each key that attempts to login to lock 12. A permission (described below) controls whether or not individual keys must enter a PIN before being granted access even if the Require-PIN-Entry operating parameter is disabled.

The PIN-Life operating parameter may be used to specify a number of days in which a PIN may be left unchanged. At the expiration of PIN-Life days from the last PIN change for a key (as recorded in the PIN-Date key database parameter described above), the user will be required to change the PIN. In one embodiment, the PIN-Life function is disabled if the PIN-Life parameter is set to zero.

The Idle-Key-Life operating parameter may be used to specify an interval within which a login of a particular key must occur before the key will be deactivated by the server. Advantageously, the administrator of the lock is not required to deactivate unused or revoked keys from the lock. Instead, keys will be automatically deactivated after the Idle-Key-Life interval expires. Idle-Key-Life will be explained in more detail below.

As mentioned above, the PIN-Reject-Limit operating parameter specifies the number of unsuccessful login attempts that will be permitted prior to the application of a pin rejection penalty. In one embodiment, PIN-Reject-Limit may be a number between 3 and 9, inclusive. If the PIN-Reject-Limit is equaled by the Successive-Bad-PIN-Count for a key without an intervening successful login, then the pin rejection penalty is applied according the PIN-Reject-Mode operating parameter. The PIN-Reject-Mode parameter specifies either a time interval before a login attempt of the affected key will again be permitted or deactivation of the affected key. If the PIN-Reject-Mode parameter specifies the time interval penalty, then the Login-Delay-Duration parameter specifies the length of the time interval. In one embodiment, the Login-Delay-Duration parameter may specify a delay between 1 and 255 minutes, inclusive.

Users are expected to actively operate lock 12 when logging in and when logged in. Accordingly, a PIN-Entry-Timeout operating parameter specifies the maximum length of time that may expire between a user's entering of successive PIN digits. In one embodiment, this parameter is fifteen seconds. If the time interval expires without another digit being entered, the user is logged out. Additionally, the User-Input-Timeout operating parameter specifies the maximum time interval between user inputs of any kind before the user is logged out. In one embodiment, the User-Input-Timeout parameter is thirty seconds.

In order to prevent a user from being forced by a third party to access lock 12, a Duress-PIN-Mode operating parameter is available. A user may access lock 12 using a PIN code modified from the user's real PIN code when being forced to access lock 12, and the server will activate an attached alarm as well as allowing the user access to lock 12. The modified PIN code may be one greater than the user's PIN in the least significant digit (i.e. the least significant digit is incremented but any carry is discarded). Alternatively, the final digit of the pin may be modified by five (either increased or decreased, whichever leaves the result positive but does not generate a carry). The Duress-PIN-mode parameter selects between the two PIN modification methods as well as a disable value which disables Duress-PIN-mode.

As described above, the Location-Code operating parameter uniquely identifies lock 12 from among other similar locks owned by the same purchaser.

In order to ensure that at least a certain Key-Level is active within lock 12 at all times, a Min-Max-Key-Level parameter is stored within the operating parameters database. When a key deactivation is requested and the Key-Level associated with that key is greater then the Min-Max-Key-Level parameter, then the database of keys is searched to ensure that at least one other active key having a Key-Level greater than the Min-Max-Key-Level exists. If such a key does not exist, then the key deactivation is not performed. The purchaser may limit certain permissions to Key-Levels above the Min-Max-Key-Level value, and hence benefits from this automatic safeguard against deactivation of all keys above the Min-Max-Key-Level.

To allow for recovery from a lost key, a lost key override feature is implemented in lock 12. This feature is enabled by setting the Lost-Key-Override-Enable operating parameter. When enabled, the lost key override feature allows for entry of a code when lock 12 is in idle mode (i.e. no key is currently logged in). The code is obtained from the OEM, and is valid only for a specific key, lock, and day. When the code is entered along with the specific key's PIN, then lock 12 allows access as if the specific key had been presented.

The Daylight-Savings-Schedule operating parameter enables a user to change the dates upon which daylight savings time changes are made effective. The Daylight-Savings-Schedule parameter includes two dates, one for each of the standard daylight savings times changes.

A set of parameters are associated with each of eight possible doors. The Door-Configuration operating parameter for each door includes the door type, the solenoid and sensor associated with the door (if any), and which other door that the current door is "behind". A door is behind a second door if the second door must be opened before a user can gain physical access to that door. The solenoid associated with a door identifies which of solenoid drivers 78 (shown in FIG. 5) is activated when the door is unlocked. The sensor associated with a door identifies the open and closed position of the door. Doors may be classified as several types including inner doors, outer doors, deposit doors, and entry doors. An inner door is a door which lies behind an outer door such that the outer door must be opened in order to obtain physical access to the inner door. An outer door is a door which is not behind any inner doors. A deposit door is a door which is configured to allow items to be placed within the safe, but does not allow items to be removed. Entry doors are defined below. It is noted that the following description refers to "locking" and "unlocking" doors. When lock 12 "locks" a door, lock 12 activates the door's locking mechanism. Similarly, lock 12 "unlocks" a door by deactivating the door's locking mechanism.

Each door may have up to five Openable-Interval operating parameters defined. An openable interval defines a time interval in which a door may be opened. Each openable interval is associated with a particular day or days, and includes a start time and a stop time. If the start time is later than the stop time, then the stop time is associated with the subsequent day. A door may only be opened within an openable interval, except under the control of the Timelock-Override operating parameter described below. A door having intervals of time in which it may not be opened is said to be "timelocked" during those intervals.

Openable intervals may be shortened through the use of the Timelock-Early operating parameter. If the Timelock-Early parameter is enabled, then a user may timelock an outer door during an openable interval. The door will be locked until the beginning of the next openable interval during that day, such that a user may not unlock the door even during the remainder of the openable interval in which the early timelock is applied. The Timelock-Early feature bestows enhanced flexibility by allowing a typical openable interval to be easily modified for one day without requiring the openable interval to be programmed to the new interval, then reprogrammed to the original interval the following day. The Timelock-Early feature will be described in more detail below.

The Timelock-Override operating parameter enables a pair of users to unlock lock 12 at a time which is not within an openable interval. The timelock override feature is provided to allow access to a safe when an armored carrier arrives to collect the contents of the safe. Such an arrival may not always be predictable when programming openable intervals. A pair of permissions are assigned to the timelock override feature, as will be discussed below. No more than one of the pair of permissions may be assigned to a single key. When the Timelock-Override parameter is enabled, a pair of keys may then be used to unlock an outer door at a time which is not within the openable intervals for that outer door. The openable intervals for inner doors may be overridden by such keys as well. Additionally, the access delay parameters described below may be disabled when the pair of keys is used.

The first key (which is intended to be in the possession of the armored carrier) logs into lock 12 and the user requests to open an outer door outside of an openable interval for the outer door. If the first key successfully logs in, then the second key must be presented to lock 12 within ten seconds. If the second key successfully logs in as well, then doors for which both keys have unlock permission may be unlocked (regardless of the openable intervals for the doors).

The Delay-Interval, Access-Interval, and Open-Warning-Interval operating parameters for each door identify the access sequence for that door. When a user requests to unlock a door and the door's Delay-Interval parameter is non-zero, an interval of time equal to the Delayed-Interval parameter passes before the door may be unlocked. The amount of time spent waiting is displayed on the display screen, and may be configured to count up from zero or down from the Delayed-Interval parameter value. When the delay interval expires, the lock emits a beep (under the control of yet another parameter) alerting the user that the door is ready to be unlocked. The user then may login and open the door within an interval of time defined by the Access-Interval parameter. After the Access-Interval time expires, the door is locked and the process must be restarted. In one embodiment, the Access-Interval parameter may be set to zero indicating that the Access-Interval expires at the end of the current openable interval or fifteen minutes, whichever is greater. Once the user logs in, the solenoid associated with the requested door is activated for seven seconds during which the door is unlocked. If the Delay-Interval parameter is zero, then the door is unlocked upon the user's first request to unlock the door. Additionally, the access interval begins immediately.

Once the door has been opened and the access interval has expired, lock 12 begins to beep to remind the user to close the door. The Open-Warning-Interval determines how long such beeps will be sounded before activating a signal to an external alarm indicating that the safe has been compromised. If multiple doors are open simultaneously and their Open-Warning-Intervals are being counted down, the Open-Warning-Interval closest to expiration is displayed on display screen 28.

The Log-Deposits parameter specifies whether or not deposit logging is enabled for deposit doors. If a user requests to open a deposit door and Log-Deposits is enabled, then the user is requested to enter the amount (of money) being deposited. If a valid (non-zero) amount is entered, then the user enters a deposit number inscribed upon the parcel being deposited, and then the requested deposit door is unlocked. The deposit amount and the deposit number are recorded by lock 12 and may later be printed as part of a report. If an invalid (zero) amount is entered, then the user is prompted for a valid amount. The deposit logging function will be discussed in more detail below.

Each key has associated with it a set of permissions as defined by the Key-Permissions-Control parameter. Table 4 lists the permissions for one embodiment of lock 12.

TABLE 4

| Permissions |
|---|
| Unlock Door 1 |
| Unlock Door 2 |
| Unlock Door 3 |
| Unlock Door 4 |
| Unlock Door 5 |
| Unlock Door 6 |
| Unlock Door 7 |
| Unlock Door 8 |
| Print History |
| Display History |
| Print Database |
| Display Database |
| Adjust Time for Daylight Savings Time |
| Set Outer Door Access Parameters |
| Set Inner Door Access Parameters |
| Set Outer Door Openable Intervals |
| Set Inner Door Openable Intervals |
| Set Access Parameters for Deposits |
| Set Access Parameters for Entry Doors |
| Set Time and Date |
| Set Operating Parameters |
| Remote Login |
| Set Openable Intervals for Entry Doors |
| Set Openable Intervals for Deposits |
| First Key Timelock Override |
| Second Key Timelock Override |
| Login Without Pin |
| Enroll Factory Key |
| Make Keys |
| Perform Factory Setup |
| Enroll Keys |
| Deactivate Keys |
| Modify Keys |
| Arm/Disarm Alarm Panel |

A key is described as having a permission if the key is enabled for that permission via the appropriate value in the Key-Permission-Control parameter of the key's database. In one embodiment, each permission is represented by a bit. If the bit is set, the permission is enabled. Conversely, a cleared bit indicates that a permission is disabled.

The Unlock Door permissions (1–8) indicate that the key is permitted to unlock a particular door. The Print History and Print Database permissions indicate that the key is permitted to print the history database and the database of keys, respectively, on a printer attached to the logic board hardware. Similarly, the Display History and Display Database permissions indicate that the key is permitted to display the respective database on lock 12's display screen. The history database is defined in more detail below.

A key may be permitted to adjust the Daylight-Savings-Schedule operating parameter via the Adjust Time for Daylight Savings Time permission. If a key has an active Set Outer (Inner) Door Access Parameters permission, then the user may change the Delay-Interval, Access-Interval, and Open-Warning-Interval parameters for the associated type of door. Similarly, a key having an active Set Outer (Inner) Door Openable Interval permission enables a user to change the openable intervals of an outer (inner) door. Similar functionality may be enabled for deposit doors and entry doors using the Set Access Parameters for Deposits, Set Access Parameters for Entry Doors, Set Openable Intervals for Deposits, and Set Openable Intervals for Entry Doors permissions.

Time and date variables stored within lock 12 may be changed if the logged in key has the Set Time and Date Permission. The operating parameters (such as those listed in Table 3) may be modified if the key has the Set Operating Parameters permission. Remote Login, discussed in detail below, is enabled for a key by the Remote Login permission. The permissions associated with the timelock override parameter are the First and Second Key Timelock Override permissions. A key may be enabled to login without PIN entry if the Login Without PIN permission is set and the Require-PIN-Entry parameter is disabled. Even though the Location-Code of lock 12 is an operating parameter, it may not be changed by a key having the Set Operating Parameters permission. Instead, a key must have the Perform Factory Setup permission as well as a Location-Restriction parameter value of zero to change lock 12's Location-Code operating parameter.

A key has a Key-Administration-Authority defining the Key-Levels that a key may enroll (or activate), deactivate, or modify. Additionally, the key must have the corresponding Enroll Keys, Deactivate Keys, and Modify Keys permissions to perform these actions. The Enroll Factory Key permission authorizes a key to enroll another key having the Perform Factory Setup permission. A factory key must be the first key enrolled in the system, and allows the bootstrapping of a lock 12 when lock 12 is first purchased. The Make Keys permission is used by the manufacturer to make keys for a lock 12. Finally, the Arm/Disarm Alarm Panel permission allows a key to arm or disarm an external alarm which is connected to lock 12.

In addition to the database of keys described above, a history database is also stored within the server portion of lock 12. The history database records user transactions with lock 12 in chronological order. In one embodiment, up to 4700 of the most recent transactions may be stored in the history database. Each record includes information identifying the user performing the transaction, the date and time of the transaction, and action performed. History reports may be requested, and the data extracted from the history database may be qualified with a time interval, Employee-Unique-Identifier, or type of action. Such reports may be displayed on the screen, printed on a printer, or transferred to a PC via remote login. Reports of data stored in the database of keys may also be generated, including the enrolled keys and the database values associated with the key (as described above).

Each of the eight doors that may be configured into lock 12 may be an outer door, inner door, deposit door, or entry door. The nesting of doors may be one level deep (i.e. an inner door may be behind an outer door but not another inner door). The bolt position switch 86 and door plug 80 (shown in FIG. 5) associated with each door is configurable. Door access is performed according to the associated access delay parameters. Additionally, a door may be unlocked at any time if the door is sensed to be open through bolt position switch 86. In this manner, a door that is accidentally locked while still open may be closed and locked.

An entry door is a special type of door which is not physically attached to the safe itself. An entry door, for example, may be a door to a room in which the safe is housed. Entry doors operate differently than other doors, and their associated parameters are interpreted differently as well. An entry door may be opened during the openable interval for the door. Nothing is logged in the history database of lock 12 for this action, with the exception of the first occurrence of opening of the entry door within a particular openable interval. The first time that the entry door is opened during an openable interval, the user logs in to lock 12 and the user is recorded as having opened the entry door. If an entry door is opened outside of its openable intervals, then a user must login to lock 12 within the time interval defined by the entry door's Delay-Interval parameter. If the user does not login, then the external alarm connected to lock 12 is activated. If the user does login, the action is recorded in the history database. Once the user has logged in, the entry door may be opened repeatedly within the Access-Interval for that door.

Lock 12 is additionally configured with a diagnostics jumper comprising a pair of electrical conductors physically placed near each other. Typically, the conductors are not electrically connected, and lock 12 operates as described above. If the conductors are momentarily electrically connected together, then lock 12 enters a diagnostic mode. Diagnostic mode allows for determination of operability of the various portions of lock 12, and additionally allows for the enrollment of a factory key. The factory key is enrolled in order to make lock 12 operational for users (i.e. to bootstrap lock 12). The factory key may be used to enroll other keys, for example. Additionally, diagnostics mode is used with the remote login feature of lock 12.

Figure 6:
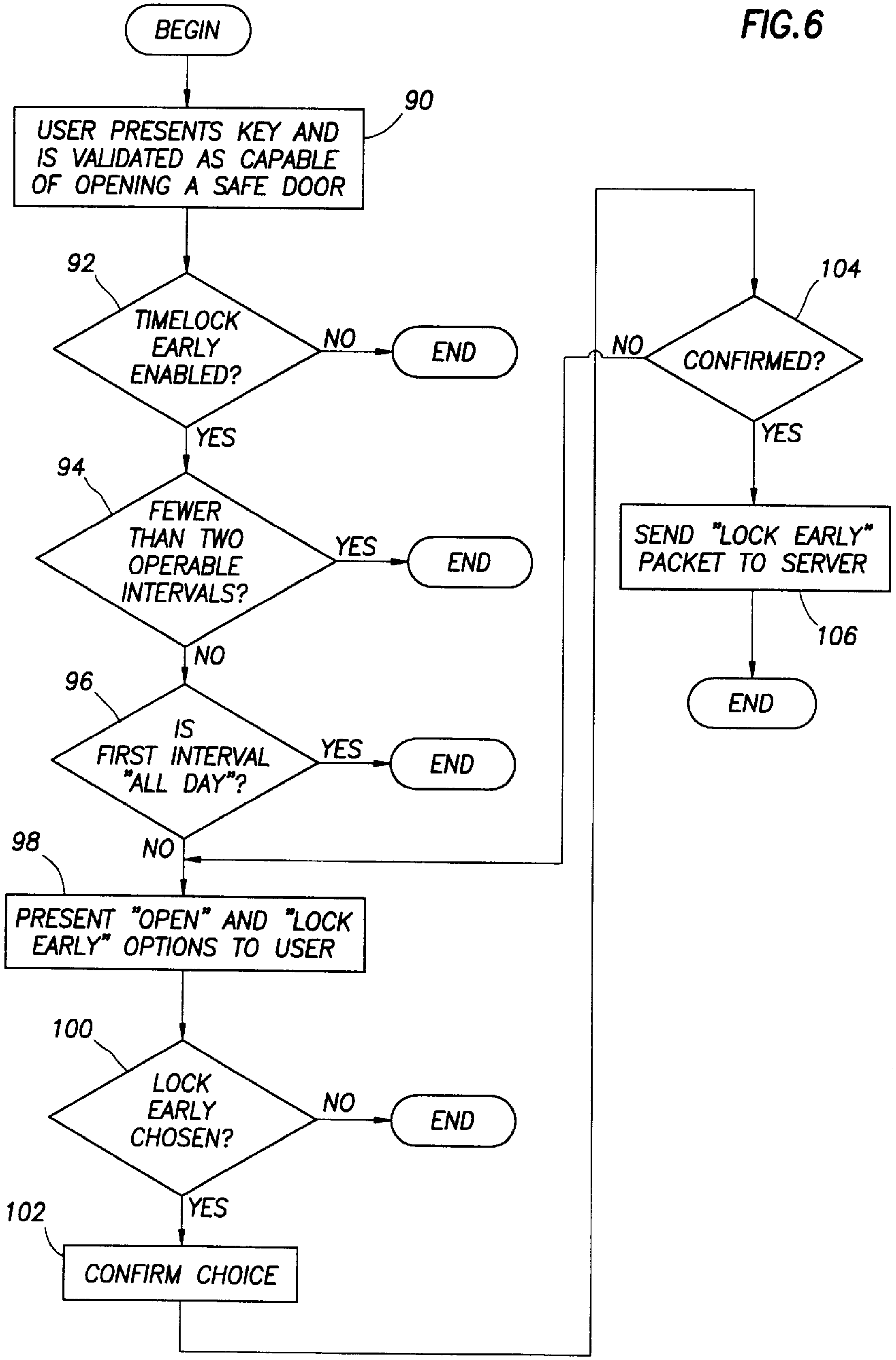
FIG. 6 is a flowchart of the client portion of a programmable timelock early function according to the present invention.

Turning next to FIG. 6, the client portion of the timelock early feature is shown in flowchart form. The timelock early feature is enabled via the Timelock-Early operating parameter. The steps in performing the timelock early feature begin with the user logging in and being validated as capable of opening a particular outer door, shown in step 90. Steps 92, 94, and 96 are decision boxes at which lock 12 examines the operating parameters to determine if timelock early is enabled (step 92) if the selected door is configured with less than two openable intervals (step 94) and if the first openable interval is configured as all day (step 96). First, if timelock early is not enabled via the Timelock-Early operating parameter, then the timelock early feature is complete. It is noted that the Timelock-Early operating parameter is stored in the server portion of lock 12. The client maintains a copy of the Timelock-Early operating parameter to perform step 92. If the server changes the value of the Timelock-Early operating parameter, the server updates the client with the new value.

If timelock early is enabled but the selected door has less than two openable intervals defined, then the door is not capable of being locked early. The reason for the specification of at least two openable intervals will be explained below. However, if the door is defined to have at least two openable intervals, then step 96 is performed by examining the first openable interval. If the first openable interval is not "all day" (i.e. the door is not configured to be continuously openable), then timelock early may be applied to this door. If the door is openable all day, then the openable interval never expires and so the timelock early, if applied to the all day interval, would never expire. The door would then become permanently locked. If step 92 is resolved as yes, step 94 is resolved as no, and step 96 is resolved as no, then step 98 is performed. The user is presented with the option of opening the selected door (which the user would be presented with in any case) and with the option of locking the door early. If the user chooses to timelock early in step 100, then the user is requested to confirm the timelock selection (steps 102 and 104). The confirmation step allows a user to rescind the timelock early selection, in case the user mistakenly chooses the timelock early option. If the user confirms the timelock early choice, then the client transmits a "lock early" request to the server (shown as step 106). Among the information sent to the server is the door selected for early locking.

If the user rescinds the timelock early choice at the confirmation step, then the client returns to step 98 and presents the user with the open door and timelock early options once again. The user is then able to select either option.

Figure 7:
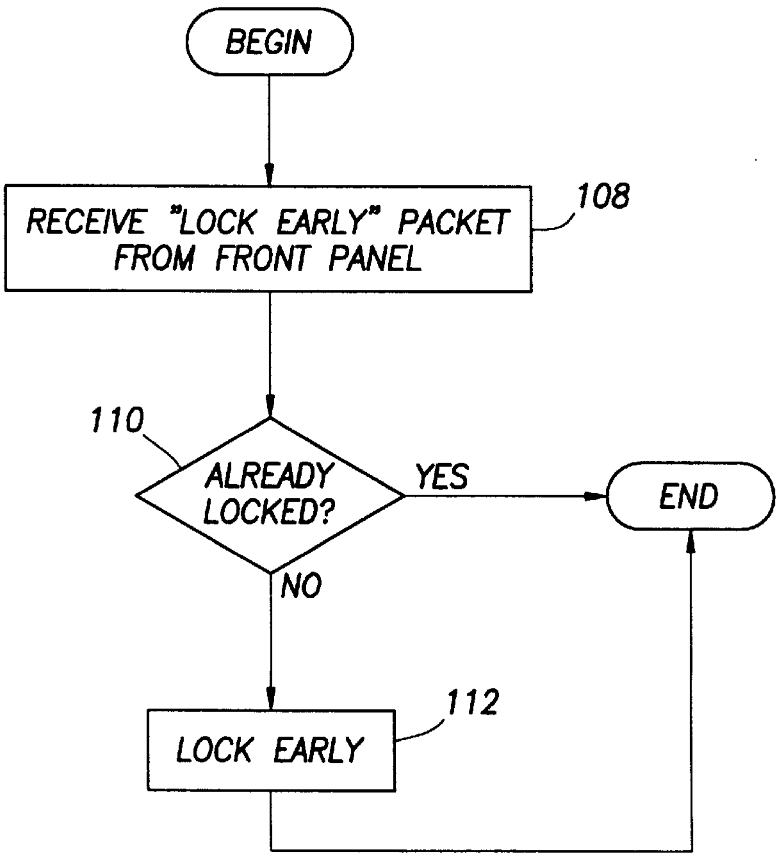
FIG. 7 is a flowchart of a first server portion of the programmable timelock early function according to the present invention.

The server portion of the timelock early feature includes two independent portions, shown as flowcharts in FIGS. 7 and 8. FIG. 7 shows the steps employed to lock the selected door in response to a lock early request from a client. When a lock early request is received from the client (step 108), then the server checks the selected door to determine if it is already timelocked (step 110). If it is timelocked, then no action need be taken. If it is not locked, then the door is locked and an indication that the door is locked early is set (step 112). The door is locked for the remainder of the current openable interval.

FIG. 8 shows a portion of the timelock early feature performed once per second by the server during operation. For each door, the server checks for an indication that the door was timelocked early (step 114). If it was not, then no action need be taken with respect to the door. If the door was locked early, then the server examines the doors openable intervals. If the current time is not within an openable interval for the door, then the early timelock is discarded and door access is controlled by the door's openable intervals (steps 116 and 118). Therefore, the server may correctly determine when to release an early timelock. In another embodiment, a door may be timelocked early if the door has at least one openable interval and that openable interval is not "all day".

As can be seen from the foregoing, causing lock 12 to lock early is a relatively convenient process for the user. Without the timelock early function, a user would need to reprogram the current openable interval to lock at the desired time. The following day, the user would then need to reprogram the openable interval to the original value. Additionally, the purchaser of the lock does not necessarily wish to permit users to modify the openable intervals. Not all users can be trusted with such a power, which would allow the user to open the safe at a time convenient to the user. The user could use such a power to steal the contents of the safe. With the timelock early feature, users may cause lock 12 to timelock early when necessary but may not change the openable intervals. Security is increased in that lock 12 may timelock early at the request of the users (securing the safe when no users are nearby), but tight control may be maintained over the openable intervals programmed into lock 12 (securing the safe from a dishonest user).

Figure 9:
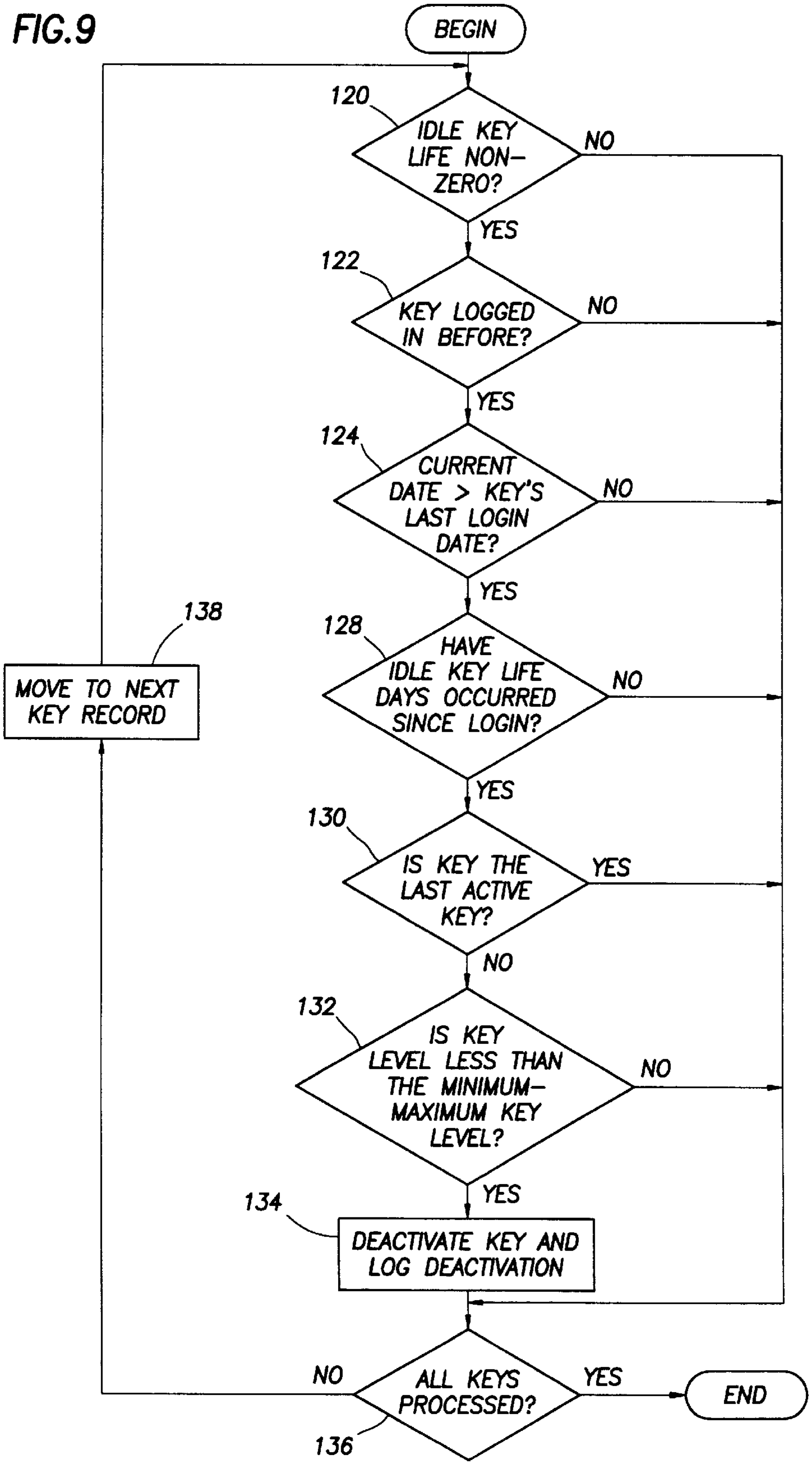
FIG. 9 is a flowchart of a programmable idle key life function according to the present invention.

Turning next to FIG. 9, a flowchart depicting the steps performed by the server for employing idle key life is shown. The server performs the steps of FIG. 9 each day of operation at a specified time. In one embodiment, the specified time is 2:00 a.m. (according to the time maintained by lock 12). The server scans each key record in the database of keys to determine if it should be deactivated because it has been idle for more than the number of days specified in the Idle-Key-Life operating parameter. The term idle means that the key has been logged in at least once before but has not been logged in the most recent Idle-Key-Life days.

Step 120 shows that the Idle-Key-Life operating parameter is examined to determine if it is zero. An Idle-Key-Life value of zero disables the idle key life feature of lock 12. If the Idle-Key-Life is non-zero, then the key data is examined (steps 122 through 132). First, the server determines if the key has logged in previously. The Last-Login-Date parameter is zero if the key has not logged in to lock 12 since it was activated, and a valid date if the key has logged in. If the key has not logged in, then the key may be waiting to be assigned. Therefore, it is convenient for the key to remain enrolled. If the key has logged in, the current date is greater than the key's Last-Login-Date, and Idle-Key-Life days have passed since the last login of the key into lock 12, then the key is a candidate for deactivation due to its idle time expiring.

Several other safeguards are imposed before deactivation of the key, shown as steps 130 and 132. First, if the key is the last active key then it is not deactivated. If all keys in the database of keys are deactivated, then lock 12 may not be conveniently accessed by any users. Diagnostics mode would have to be entered, and the factory key used to enroll keys. Second, if the Key-Level of the key is greater than the Min-Max-Key-Level operating parameter, then the key is not deactivated. Powerful keys (i.e. keys with a high Key-Level) may often be idle for long periods of time, but should remain active. Powerful keys are typically issued to trusted users, and so security is not significantly impacted by not deactivating powerful keys that have been idle for long periods of time. Deactivation includes setting the key's status parameter to inactive.

After processing the key (steps 120 through 134), the server determines if all keys within the database of keys have been processed (step 136). If not, the server retrieves the next key record (step 138) and performs idle key life processing upon it. Once each key within the database of keys has been processed, the idle key life feature is complete until the next day of operation.

The foregoing discussion describes how keys are automatically deactivated if idle for a specified interval of time. In this way, keys which are no longer in use become inactive without requiring the intervention of an administrator. Additionally, keys are deactivated for users which are no longer authorized to access lock 12 even if the administrator mistakenly does not perform the deactivation. Security of lock 12 is therefore increased.

Figure 10:
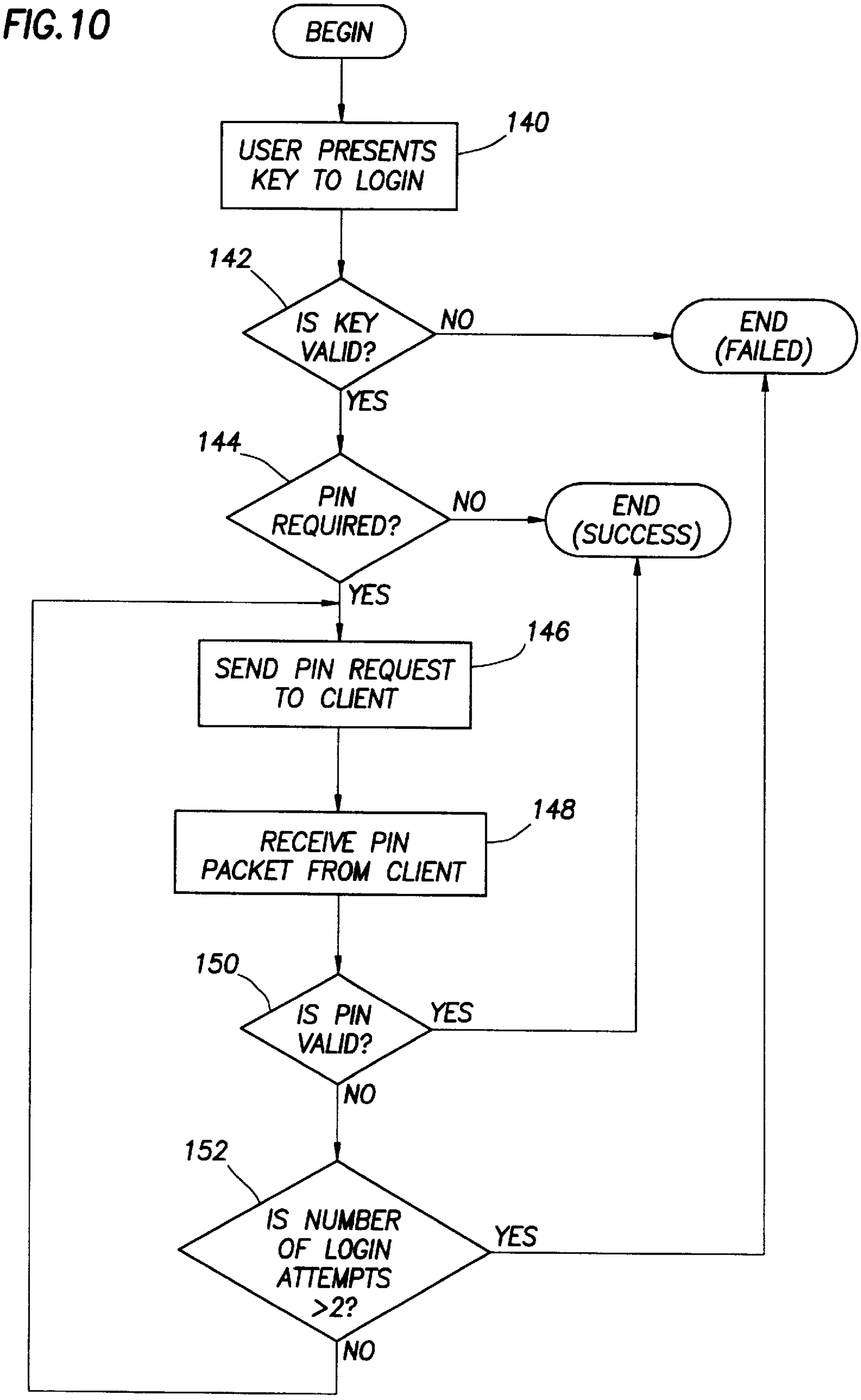
FIG. 10 is a flowchart of the server portion of a PIN code validation function according to the present invention.

Turning next to FIG. 10, a flowchart of the server procedure for requesting and validating PIN information associated with a key is shown. The server begins PIN validation when a user presents a key to login to lock 12 (step 140). The server first checks the database of keys to ensure that the key is enrolled and active (step 142). If the key is not enrolled or is currently deactivated, then the user is not permitted access regardless of whether or not the user enters the appropriate PIN. However, if the key is enrolled and active, then the server determines if a PIN is required (step 144). Lock 12 employs two levels of PIN requirement. The first level is represented by the state of the Require-PIN-Entry operating parameter. If the Require-PIN-Entry operating parameter is set, then lock 12 requires a PIN from any key that attempts to login. Safes containing more important items or larger sums of money may be protected in this manner. Safes which may be more loosely controlled may clear the Require-PIN-Entry operating parameter. The second level of PIN requirement is represented by the Log-in-Without-PIN permission of each key. If the Log-in-Without-PIN permission is set for a user's key, then the server does not require a PIN from that user (assuming the Require-PIN-Entry operating parameter is clear). However, if the Login Without PIN permission is clear for the user's key, then the server requires a PIN from the user before allowing login. Therefore, the PIN requirement may be managed on both a lock-by-lock basis and a key-by-key basis. Flexibility and security are enhanced using the above PIN requirement structure.

If the server determines that a PIN is not required, then the user is logged in. However, if a PIN is required, then the server transmits a request for PIN to the client at which the user attempted to login (step 146). The client displays a request for the PIN number and accepts the PIN entry from the keypad, transmitting the PIN to the server. The server receives the PIN from the client (step 148) and validates the PIN by comparing it to the PIN number stored on the key. If the entries match, then the user is logged in. However, if the PIN entries do not match, the PIN is again requested from the user. If the user fails to provide a correct PIN after several consecutive attempts, then the user is not logged in and the Successive-Bad-PIN-count of the key is incremented (step 152). In one embodiment, three attempts to provide the correct pin are allowed.

Figure 11:
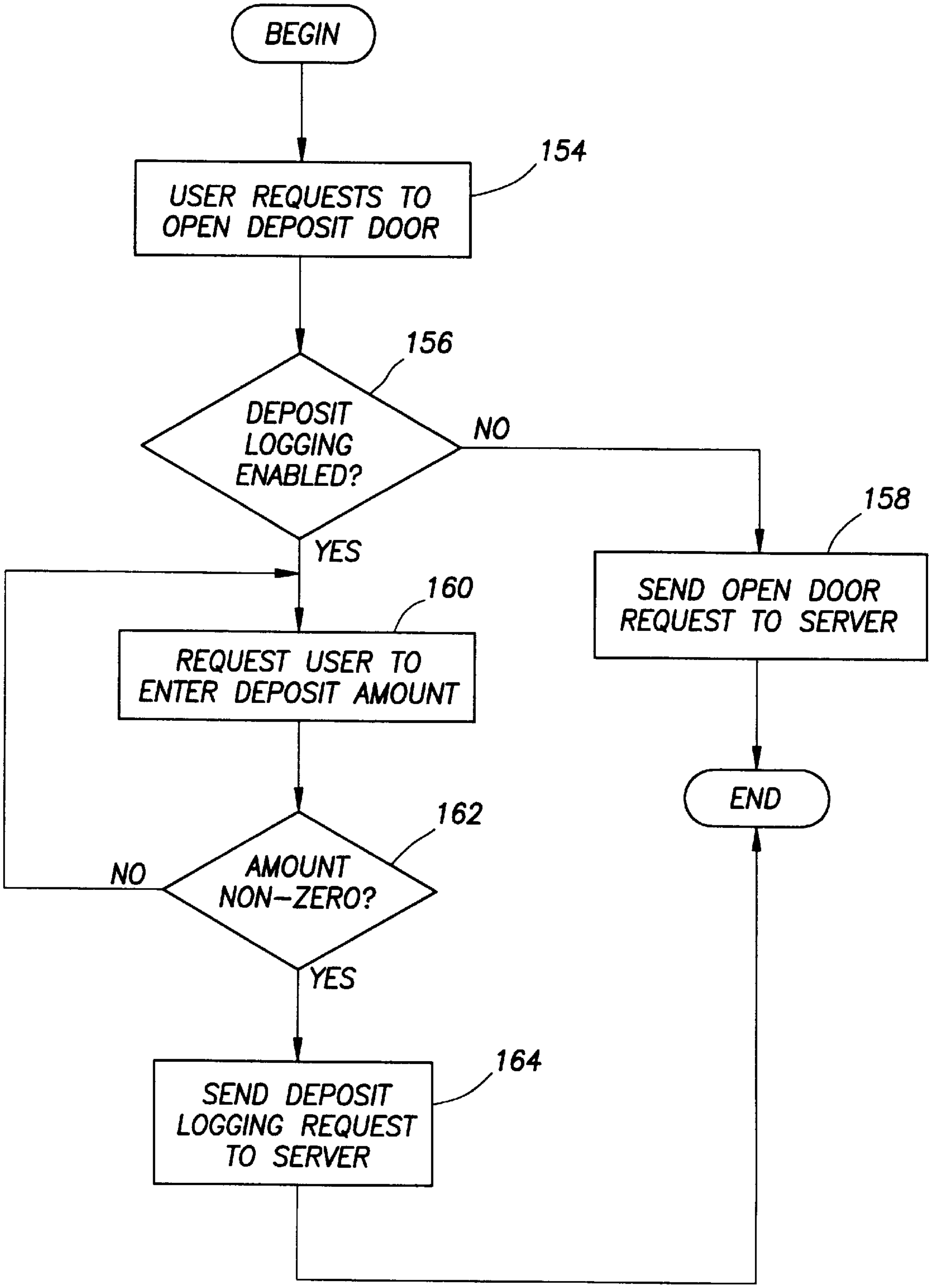
FIG. 11 is a flowchart of the client portion of a programmable deposit logging function according to the present invention.

Turning now to FIG. 11, the client portion of the deposit logging feature is shown as a flowchart. The deposit logging feature is activated when a user requests to open a deposit door (step 154). Upon receiving a request to open a deposit door, the client examines the value of the Log-Deposits operating parameter (step 156). It is noted that the Log-Deposits operating parameter is stored within the server. The client maintains a copy of the Log-Deposits operating parameter, and the server updates the client if the value of the Log-Deposits operating parameter is changed. If the Log-Deposits operating parameter indicates that deposit logging is disabled, then an open door request is transmitted to the server with respect to the deposit door (step 158). If deposit logging is enabled, the client displays a request for the amount of money being deposited on the display screen (step 160). The client accepts user input from the keypad, and determines if the amount entered is valid. In one embodiment, the amount entered is valid if it is non-zero (step 162). If an invalid amount is entered, the client returns to step 160 and requests that the deposit amount be entered. When a valid amount has been entered, the deposit amount is transmitted to the server as a deposit logging request (step 164). Additionally, a deposit logging number provided by the users is transmitted. The deposit logging number is recorded upon the parcel to be placed into the safe via the deposit door. Upon receiving the deposit logging request, the server transmits an open door request to the selected deposit door.

Turning next to FIG. 12, the server portion of the deposit logging feature is shown as a flowchart. The server receives a deposit logging request from the client (step 166), and logs the user performing the deposit along with the deposit amount in the history database (step 168). Additionally, the server unlocks the requested deposit door (step 169). Security is advantageously increased by recording the user performing the deposit action along with the amount. If an amount in a parcel is later found to differ from the deposit amount recorded by lock 12, the user may be interrogated to determine the reason. Therefore, the user has a strong disincentive to fraudulently record an incorrect deposit. When employed with a defined deposit interval policy requiring users to make regular deposits, security may be increased. A missed deposit or a deposit which does not later reconcile with the recorded amount may identify a dishonest user.

Turning now to FIG. 13, a flowchart showing the server actions for a remote login requiring an enrolled key is shown. As noted above, lock 12 is configured to allow a PC to connect at printer/PC port 72. Because the connection point is physically different than front panel interface plug 68, lock 12 can discern whether a client is a PC client or a front panel hardware client. If lock 12 receives a login request from a PC (steps 170 and 172), then lock 12 checks the Remote Login permission associated with the key. If the key has Remote Login permission, then login procedures continue normally (steps 174 and 176). If the key does not have Remote Login permission, then login is denied (steps 176 and 178).

Remote login advantageously enables a centralized user to remotely access many distally located locks without having to physically travel to each lock. Instead, a PC equipped with a modem may be used. The problem of enrolling the key for its initial use, however, still exists. Inconveniently, the user would have to travel to each lock to enroll the key before being able to remotely access the lock. However, when lock 12 is in diagnostic mode it is configured to allow a remote login of a key. The procedure is as follows: a local user places lock 12 into diagnostic mode. The remote user directs the PC to connect to lock 12 via the modem. Lock 12 is configured to allow enrollment of a remote key when in diagnostic mode, so the remote user enrolls the remote key. Lock 12 is then removed from diagnostic mode and the user may thereafter login remotely. Advantageously, the key has been enrolled remotely and so the remote user need not travel to the lock location to initialize his or her key.

A modem is used to allow remote enrollment and access. The modem is attached to lock 12, and is placed into auto-answer mode at three distinct times: when the modem is enabled by lock 12; whenever a reset of lock 12 is performed; and when the power to lock 12 is switched on. By placing the modem in auto-answer mode, the modem will connect to the remote user when enabled during attempts to connect the user to lock 12.

Turning now to FIG. 14, a front view of a PC 34 is shown having a key receptacle 180 similar to key receptacle 20. Key receptacle 180 accepts a key for remote login via the computer situated distal from lock 12. Key receptacle 180 is electrically coupled to PC 34 via a RS-232 serial connection so that data may be transferred between PC 34 and a key inserted into key receptacle 180. PC 34 communicates with logic board hardware 32 in a substantially similar fashion to the communication between logic board hardware 32 and front panel hardware 30. Therefore, a remotely logged in user may perform substantially similar functions to a locally logged in user having similar permissions. A "locally logged in" user is a user logged in through front panel hardware 30. In one embodiment, a remotely logged in user is enabled to perform the same functions as a locally logged in user with the exception of unlocking a door, performing factory setup, and diagnostics functions.

PC 34 is coupled via a communication device 184 to a communication channel, a suitable channel being an electrical conductor 182. The communication channel provides distal communication with various electronic devices, a suitable device being lock 12 according to the present description. In one embodiment, communication device 184 is a modem and conductor 182 is a communication port for communicating via airwaves or a telephone line with lock 12. In another embodiment, communication device 184 is a serial communication device and conductor 182 is an RS-232 cable. It is understood that any suitable communications channel may be utilized for communication between PC 34 and lock 12. The modem communication device can either be mounted internal or external to the housing of PC 34. In either instance, communication device 184 is electrically connected to PC 34 typically at the backplane of PC 34.

It is noted that the above description occasionally refers to a safe as the device being locked. However, lock 12 is suitable for locking many different devices beyond a safe. It is contemplated that lock 12 be used on any enclosable device where access security is needed. It is further noted that, although the above disclosure describes a lock which allows user access upon receipt of a physical key, other forms of keys are possible. It is understood that a key may be any device for communicating information which identifies a particular user. The key need not necessary be a physical device. For example, the key may be a user identifier, such as a user number, input upon keypad 22 (shown in FIG. 2) or a user identifier, such as a user name, input upon the keyboard of PC 34 (shown in FIG. 14). Embodiments of lock 12 having such either physically carried keys or security input keys (or "keywords") fall within the spirit and scope of the key definition.

In accordance with the above disclosure, a programmable electronic lock having numerous programmable features is described. The features enhance the flexibility and security of the lock. A safe or other lockable structure employing the present lock may achieve more enhanced security and flexibility than that achievable with conventional locking technology.

Details regarding another embodiment of an electronic lock may be found in U.S. Pat. No. 5,349,345 entitled "Electronic Lock" by Vanderschel. The disclosure of Patent '345 is incorporated herein by reference in its entirety.

Numerous variations and modifications will become apparent to those skilled in the art once the above disclosure is fully appreciated. It is intended that the following claims be interpreted to embrace all such variations and modifications.

What is claimed is:

1. A remote access system, comprising:

a computer;

a key receptacle electrically coupled to said computer wherein said key receptacle is adapted to receive a key for conveying user information to said computer indicative of a user to which said key is issued;

an electronic lock located separate and distal from said computer, said electronic lock includes a storage device for storing a set of operating parameters, and said electronic lock further includes a programmable unit for activating and deactivating a locking mechanism functionally connected to the programmable unit; and a communication channel coupled between said computer and said electronic lock for transmitting the user information from said computer to said electronic lock, wherein said communication channel bypasses said key receptacle, and wherein said electronic lock, in response to said user information from said computer, is configured to allow said user to read a lock database stored within said electronic lock from said computer, said user information identifying said user to said electronic lock.

2. The remote access system as recited in claim 1 wherein said user information includes a set of permissions, and wherein said electronic lock is configured to allow user control of said electronic lock according to the set of permissions.

3. The remote access system as recited in claim 2 wherein the set of permissions includes a remote access permission of an electronic lock.

4. The remote access system as recited in claim 3 wherein said electronic lock is configured to deny login if the remote access permission is not given.

5. The remote access system as recited in claim 1 wherein said electronic lock is configured to request a PIN code prior to logging in said user.

6. The remote access system as recited in claim 1 wherein said programmable unit is configured to enter a diagnostic mode.

7. The remote access system as recited in claim 6 wherein said electronic lock is configured to login said user during a time period in which said programmable unit is in said diagnostic mode.

8. The remote access system as recited in claim 7 wherein said programmable unit is configured to enroll said key inserted into said key receptacle such that said key is enabled to login to said electronic lock.

9. The remote access system as recited in claim 1 wherein said communication channel comprises an RS-232 cable.

10. The remote access system as recited in claim 1 wherein said communication channel comprises a pair of modems operably connected to a telephone line.

11. The remote access system as recited in claim 10 wherein a first of said pair of modems is coupled to said computer.

12. The remote access system as recited in claim 10 wherein a second of said pair of modems is coupled to said electronic lock.

13. The remote access system as recited in claim 12 wherein said second of said pair of modems is maintained, during use, in an auto-answer mode.

14. The remote access system as recited in claim 1, wherein said electronic lock is further configured to allow said user to manipulate said set of operating parameters stored within said lock from said computer.

* * * * *